(12) United States Patent
Mullins

(10) Patent No.: US 8,504,466 B2
(45) Date of Patent: *Aug. 6, 2013

(54) COMPUTERIZED AUCTION SOFTWARE METHOD FOR PROVIDING A DISCOUNT OFF A HIGH BID BEFORE A BID IS PLACED

(76) Inventor: Wayne Mullins, Phoenix, AZ (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/451,462

(22) Filed: Apr. 19, 2012

(65) Prior Publication Data

US 2012/0203612 A1    Aug. 9, 2012

Related U.S. Application Data

(62) Division of application No. 11/986,480, filed on Nov. 20, 2007, now Pat. No. 8,175,915.

(60) Provisional application No. 60/860,571, filed on Nov. 21, 2006.

(51) Int. Cl.
*G06Q 40/00* (2012.01)

(52) U.S. Cl.
USPC .......................................................... 705/37

(58) Field of Classification Search
USPC ............................................................ 705/14
See application file for complete search history.

(56) References Cited

U.S. PATENT DOCUMENTS

| | | | | |
|---|---|---|---|---|
| 6,606,608 | B1 * | 8/2003 | Bezos et al. | 705/36 R |
| 8,027,880 | B2 * | 9/2011 | Darveau-Garneau | 705/26.3 |
| 2002/0065769 | A1 * | 5/2002 | Irribarren et al. | 705/37 |
| 2008/0114661 | A1 * | 5/2008 | Byde et al. | 705/26 |

* cited by examiner

*Primary Examiner* — Jessica Lemieux
(74) *Attorney, Agent, or Firm* — Mark V. Loen

(57) ABSTRACT

A method and system for conducting an auction. The auction system provides a criteria for a seller to offer an item for sale with a discount off the bid that is displayed before a bid is made by the bidder, and/or a discount that is advertised from a minimum discount up to a maximum discount off the bid amount that is declared and displayed after the auction is closed. The discount(s) apply to the bidders initial bid and each raised bid and are not contingent on or to another condition. The auction system provides a mechanism to conduct an auction that allow persons to pay a bid fee to register as a bidder, register an opening bid with a discount that is stated before a bid is made by the bidder and a means for when the auction opens at a later date, to accept the registered opening bids.

13 Claims, 9 Drawing Sheets

200

| Auction: | Pay Bid Fee and Register Opening Bid |

Auction lot number [ ] ─ 201

Name of Bidder [ ] 202

Name of Item 203

Brief Description and Photo ─ 204

Item Value [ ] — 205

Discount displayed before the bidder makes a bid. [ ] ─ 206

Bid registration fee: [ ] ──── 207

Opening bid is for: [ ] ──── 208

Bid on lot number [ ] and pay bid fee by: ──── 209

Select payment method ─ 210

220

Discount displayed before bid is made - Calculator 221

Item Value [ ] 222

Project OPENING Bid amount: [ ]    Show Example 223

Discount displayed before bid is made is: [ ] ── 224

Discount off your bid would be: [ ] — 225

Opening bid would be reduced to: [ ] — 226

230

Discount displayed after auction closed - Calculator 231   232

Project a bid amount: [ ]    Show Example

Projected Discount displayed after auction is closed [ ] ── 233

Discount off your bid would be: [ ] — 234

Projected bid would be reduced to: [ ] — 235

Bid fee payment, registered opening bid, bid number and auction 1st discount confirmation Congratulations, your bid fee payment has processed successfully.

Registered Bidder    [@bidders email address] — 301
                                              — 302

Lot number:    [        ] — 303

Bid number:    [        ] — 304

Opening Bid:   [        ] — 305

Discount off opening bid  [   ]   Displayed before the bidder makes each bid.
                    306

Notice to Open and Close the Auction    401

Registered Bidder    [@bidders email address]

Lot number:    [        ] — 402

Lot Value:     [        ] — 403

Bid Number:    [        ] — 404    406

Opening Bid displayed
before bidder makes a bid:  [        ] — 405    407    408

The Date & Time to Open the Auction for  [Lot #] is: [Date] [Time]

The Date & Time to CLOSE the Auction for [Lot #] is: [Date] [Time]
                                          409    410    411

Auction is OPEN — 501

Auction Accepts Opening Bids

| | | |
|---|---|---|
| Auction lot number | ☐ — 502 | 503 |
| | Name of Item | |
| | Brief Description and Photo | — 504 |
| Item Value | ☐ — 505 | |
| Bid number | ☐ — 506 | |
| Opening Bid is for: | ☐ — 507 | |

510

Bidding Begins

Current highest bid is: ☐ — 511
Discount displayed before bid is made: ☐ — 512
Raise my Bid? ☐ Yes — 513
 — 514                                                515
Raise my bid to: ☐  Calculate table BEFORE Submit Raised Bid? ☐ Yes
My win position is: ☐ ——— 516
                                                                                517
Submit Raised Bid or change your Raised Bid amount?  [ Submit ]
Auction ends in: | Hours | Minutes | Seconds | ——— 518

520

Discount displayed before a bid is made & Discount displayed after auction closed - Calculator

Project a bid amount: 521 ☐          [ Show Example ]
Discount displayed before
the bidder makes a bid: ☐                                    524
                                                        522
Project discount that is displayed
after the auction is closed: ☐
                                                        523
Discount off your bid would be: ☐
                                                        525
Projected bid would be reduced to: ☐
                                                        526
Winning bid forfeit fee would be: ☐
                                                        527

Bid Calculator / Strategy Table

/ 601

Bid Number: [ ]   Lot Number: [ ]   Value: [ ]
602                605                  604
                        606   603

Current highest bid is: [ ]

Auction Open discount: [ ] Off the bid amount

Raise my Bid? [ ] Yes ─── 607                                609

Raise my bid to: [ ]   Calculate table BEFORE Submit Raised Bid? [ ] Yes
                                                                         611
My win position is: [ ] ─── 610

Submit Raised Bid or change your Raised Bid amount? [Submit]

Auction ends in: [Hours] [Minutes] [Seconds] ─── 612

620

|      |    |                                    | 640 | 641 | 642 | 643 | 644 |
|------|----|------------------------------------|------|------|------|------|------|
| 621  | 1. | Value of the item offered for sale: | $100 | $100 | $100 | $100 | $100 |
| 622  | 2. | Last Bid Registered:               | $1,000 | $1,000 | $1,000 | $1,000 | $1,000 |
| 623  | 3. | Bid over or under Value amount:    | 900% | 900% | 900% | 900% | 900% |
| 624  | 4. | Bid amount over Value amount:      | $900 | $900 | $900 | $900 | $900 |

|      |    |                                    | 650 | 651 | 652 | 653 | 654 |
|------|----|------------------------------------|------|------|------|------|------|
| 625  | 5. | Total Discount – examples:         | 51%  | 60%  | 70%  | 80%  | 90%  |
| 626  | 6. | Total discount off bid amount:     | $510 | $600 | $700 | $850 | $900 |
| 627  | 7. | Bid amount after all discounts:    | $490 | $400 | $300 | $200 | $100 |

|      |    |                                    | 660 | 662 | 663 | 664 | 665 |
|------|----|------------------------------------|------|------|------|------|------|
| 628  | 8. | Bid purchase price - gain or loss: | $490 | $400 | $700 | $800 | $900 |
| 629  | 9. | Bid amount -V- purchase price:     | 48%  | 60%  | 70%  | 80%  | 90%  |
| 630  | 10 | Net bid ratio to bid forfeit fee:  | 3    | 2    | 2    | 0    | 1.8  |
| 631  | 11 | Bid forfeit fee per fixed amount:  | $200 | $200 | $200 | $200 | $200 |
| 632  | 12 | Winning bid forfeit fee would be:  | $180 | $180 | $180 | $180 | $180 |
| 633  | 13 | Bid forfeit fee if under lot Value: | $150 | $150 | $150 | $150 | $150 |

*FIG. 6*

Auction is CLOSED:

Auction lot number [ ] — 701

Name of Item — 702

Brief Description and Photo — 703

Item Value [ ] — 704

Bid number [ ] — 705

Bid Fee [ ] — 706

Final Bid [ ] 707

Bidding for this lot number was Opened on: [ ] — 708

Bidding for this lot number was Closed on: [ ] — 709

Discount displayed before a bid is made: [ ] — 710

Discount displayed after the auction is closed: [ ] — 711

Total of all discounts: [ ] — 712

Net bid after all discounts [ ] — 713

| Bid ID | Bid # | Opening Bid amount | O B Discount % off bid | Raise bid amount | R B Discount % off bid | Total discount % off bid | Total Discount amount | Net bid amount |
|---|---|---|---|---|---|---|---|---|
| | | | | | | | | |
| | | | | | | | | |
| | | | | | | | | |
| | | | | | | | | |

*FIG. 7*

COMPUTERIZED AUCTION SOFTWARE METHOD FOR PROVIDING A DISCOUNT OFF A HIGH BID BEFORE A BID IS PLACED

CROSS REFERENCE TO RELATED APPLICATIONS

This application is a divisional of U.S. patent application Ser. No. 11/986,480, filed Nov. 20, 2007, which claims the benefit of U.S. Provisional Application No. 60/860,571 filed on Nov. 21, 2006. Both prior applications are incorporated by reference herein.

BACKGROUND OF THE INVENTION

1. Field of the Invention

The present invention relates generally to conducting commercial transactions, and more particularly, to conducting auctions.

2. Description of Related Art

Because the present invention facilitates electronic communications between vendors and purchasers, the Internet is increasingly being used to conduct "electronic commerce." The Internet comprises a vast number of computers and computer networks that are interconnected through communication channels. Electronic commerce refers generally to commercial transactions that are at least partially conducted using the computer systems of the parties to the transactions. As an example, a purchaser can use a personal computer to connect via the Internet to a vendors computer. The purchaser can then interact with the vendor's computer to conduct the transaction. Although many of the commercial transactions that are performed today could be performed via electronic commerce, the acceptance and widespread use of electronic commerce depends, in large part, upon the ease-of-use of conducting such electronic commerce. If electronic commerce can be easily conducted, then even the novice computer user may choose to engage in electronic commerce. Which is why it important that techniques be developed to facilitate conducting electronic commerce.

The World Wide Web portion of the Internet is especially conducive to conducting electronic commerce. It is a fact that many web servers have been developed through which vendors can advertise and sell product. The products can include items (e.g., software, music) that are delivered electronically to the purchaser over the Internet and items (e.g., printed mater) that are delivered through conventional distribution channels (e.g., a common carrier). More generally, an item is any product, server, or exchangeable entity of any type. A server computer system may provide an electronic version of a catalog that lists the items that are available. A user, who is a potential purchaser, may browse through the catalog using a browser and select various items that are to be purchased. When the user has completed selecting the items to be purchased, the server computer system may then prompt the user for information to complete the ordering of the items. This purchaser-specific order information may include the purchasers name, the purchasers credit card number, billing and a shipping address for the order. The server computer system then typically confirms the order by sending a confirming web page to the client computer system and schedules shipment of the items.

The World Wide Web is also being used to conduct other types of commercial transactions. For example, some server computer systems have been developed to support the conducting of auctions electronically. To conduct an auction electronically, the seller of an item provides a definition of the auction via web pages to a server computer system. The definition includes a description of the item, a time to open the bidding, an auction time period, and optionally a opening bid. The server computer system then conducts the auction during the specified time period. Potential buyers can search the server computer system for an auction of interest. When such an auction is found, the potential buyer can view the bidding history for the auction and enter a bid for the item. When the auction is closed, the server computer system notifies the winning bidder and the seller (e.g., via electronic mail) so that they can complete the transaction.

Some auctions have been developed that allows the winning bidder to receive a discount from the winning bid amount when a certain discount criteria is met where the discount criteria is met when the winning bidder was the first bidder to place the bid at the auction. U.S. Pat. No. 6,606.608 teaches the art wherein the bidder who places the first bid will receive a discount (e.g., 10%) if that bidder is ultimately successful in winning the auction. The auction system tracks whether each auction is subject to a "first bidder discount" and whether the winning bidder was the first bidder. The offering of a first bidder discount may encourage bidders to start bidding early in the duration of an auction and to continue bidding to ensure that they receive the discount. The art further teaches that many different discount criteria can be used to encourage bidders to bid at an auction. For example, the auction system may allow successive bidders to be eligible for successively smaller discounts. That is, the first bidder may receive a 10% discount, and the second bidder may receive a 5% discount. Also, the discount criteria can be independent of the order in which the bidders placed their first bids. For example, a winning bidder who places a bid that is at least 5% larger than the second highest bid may receive a 10% discount. Such a discount criteria may encourage bidders to bid at least 5% more than the current highest bid.

U.S. Pat. No. 6,606.608 teaches the art that, to be eligible for a discount, the discount is contingent upon a bidder placing the first bid for a item offered for sale by auction that the bidder bid on and that the bidder must further qualify as the winning bidder. The discount is specified to be at least a minimum or maximum discount wherein such discount is still contingent upon a bidder placing the first bid for a item offered for sale by auction that the bidder bid on and that the bidder must further qualify as the winning bidder. The discount is not independent of the order for a bid to be placed or independent of being the winning bidder without placing a bid in a designated order. This prior art patent is incorporated herein by reference.

Whereas, this present Invention teaches the art of registering as a bidder, pay a bid fee and register an opening bid with a discount that is displayed before a bid is made by the bidder wherein such discount is not contingent on or to another condition, to be submitted to the auction within a designated time wherein the registration of a designated number of bidders that paid a bid fee become equivalent to the seller asking price for the item offered by the seller to be sold by auction, after which time the auction is opened and (i) the auction computer system submits all registered bids for that auction to that auction and (ii) the computer system accepts for that auction all opening bids submitted to that auction and (iii) the computer system declares the auction is open for competitive bidding. The present Invention discount is not contingent on the order when a bid is registered or submitted or accepted by the auction. The discount applies to all bids and therefore the discount is not limited to the winning bid.

It would be highly desirable, therefore, to improve upon the conventional method and means to promote and conduct certain auctions, auction venues, auction marketplace for sellers, bidders and buyers and auction system.

BRIEF SUMMARY OF THE INVENTION

The auction system provides a mechanism, for bidders to pay a bid fee to an auction to register as a bidder. Register a bid with a discount that is displayed before a bid is made by a bidder wherein such discount is not contingent on or to another condition, to bid on a item identified by a lot indicia to be sold by auction wherein, the criteria for the number of bid fees to open the auction can be measured in time or by a number of bid fee payments or a combination thereof whichever occurs first. Such criteria may be at the discretion of the auction or the seller of the item.

A criteria wherein the auction provides a mechanism for a seller to designate seller receiving sellers asking price form the auction, from certain bid fee payments that were made to the auction before the auction opened and from the auctions winning bidder after the auction closed.

A criteria wherein, prior to open the bidding by a auction for a item identified by a lot indicia, the seller offers a stated discount off a bid amount that is displayed before a bid is made by the bidder and a discount that is advertised from a minimum discount up to a maximum discount off the bid amount that is declared and displayed after the auction is closed. The discounts apply to the bidders initial bid and each raised bid and are not contingent on or to another condition.

A criteria wherein, there are no minimum or maximum opening bid amount or raise bid amount limitations to the bidders or to the biddings. A criteria to help discourage excessive bidding above the value amount of a item offered for sale identified by a lot indicia, wherein there is a winning bid forfeit fee which forfeit fee is, (a) generated and progressive in relation to the bidders bid amount above the value amount of the item identified by the bidders lot indicia. or (b) a stated minimum winning bid forfeit fee. Wherein a winning bidder that does not purchase the item the bidder won for the bid amount (after deducting all discounts applicable within the terms of the agreement governing the sale) is subject to payment of the higher amount of the winning bid forfeit fee.

A means to display and calculate a bidders bid along with other information wherein, such bidder could strategies at least, a bidders prospective bid, a discount displayed before making a prospective bid, a projected discount to a prospective bid amount above the value amount of a lot number and forecast a winning bid forfeit fee, before a bidder submits his bid to the auction.

The winning bidder has the right to purchase the item identified by the lot indicia, after deducting all discounts applicable, which shall then be the net bid amount as the winning bid purchase price.

The present invention relates to a unique method for listing items for sale by a auction bidding process, that permit sellers and bidders to engage in a market place venue whereby the auction system can be employed jointly or separately in various auction modes.

The present invention relates to auctions, and in particular to auctions with a discount that is displayed before a bid is made by the bidder wherein such discount is not contingent on or to another condition, that permit bidders to make a bid for an item and compete in real-time, for items offered for sale by the auction. The auction system, described herein can be employed jointly or separately in various auction modes.

BRIEF DESCRIPTION OF DRAWINGS

FIG. 2 illustrates a web page through which a bidder may pay a bid fee and register a bid to be submitted to the auction when the auction is opened, to bid for the item being auctioned.

FIG. 3 illustrates a email page through which a seller provides to a bidder, confirmation of the bidders bid fee payment, opening bid, discount off the opening bid amount and bid number.

FIG. 4 illustrates a email page through which provides a notice to a bidder of the date and time to open an auction and close an auction.

FIG. 5 illustrates a web page through which; a registered opening bid is electronically submitted to an auction and accepted by the auction. FIG. 5 at 510 further illustrates bidding begins, the current highest bidder and a discount that is displayed before a bid is made by a bidder wherein such discount is not contingent on or to another condition. FIG, 5 at 520 illustrates the function for a bidder to raise an opening bid and a calculator will calculate a discount from raised bid discount for the bidder, before the bidder submits a raised bid to an auction. A bidder can use the calculator to project a discount that is displayed before the bidder makes a bid and project a discount that is advertised from a minimum discount up to a maximum discount off the bid amount, which will be declared and displayed after the auction is closed. The discounts apply to the bidders initial bid and each raised bid and are not contingent on or to another condition.

FIG. 6 at 620, illustrates a bid calculator and table through which a bidder may use for strategy evaluation before the bidders makes the decision to enter a new bid amount. At the bidders option, bidder can enter a new bid amount and the system will calculate the new bid amount from a discount that is displayed before the bidder makes a new bid and display the projected new bid amount, and one or more projected discounts (that are advertised from a projected bid amount) of which one of the projected discounts will be declared and displayed after the auction is closed. The discounts apply to the bidders initial bid and each raised bid and are not contingent on or to another condition.

FIG. 7 illustrates a web page through which, after a auction is closed, displays the results for an auction for a bidder being notified of the auction results, which include the bidders bid number, the item auctioned, the a lot number, the bidders final bid, a date and time the auction opened and closed, the discount displayed before a bid was made by the bidder, the discount declared after the auction closed, total of all applicable discounts, the net bid amount after deducting all discounts, identifying the winning bidder and other bidders.

Step 1, a seller list an item for sale on an auction site for the asking price of $1,000 with a 50% discount that is displayed before a bid is made by the bidder wherein such discount is not contingent on or to another condition.

Step 2, the auction agrees not to open the auction to sell the item until it has collected 20 bid fee payments in the amount of $50 each for $1,000 in total bid fees (fee amount and number could vary).

Step 3, after 20 bid fee payments were paid along with registering a pre-opening bid, the auction would open.

Step 4, assume the highest bid was for $2,000 and a discount displayed before a bid is made be the bidder was for 50% and a discount displayed after the auction closed was for 35%, the total discounts would be 85%, the $2,000 bid would then be reduced to $300. Step 5, after the auction closed, the highest bidder would pay the seller $300 to purchase the item that the seller listed with the auction for the asking price of $1,000, in this instance there would be a deficiency of $700 due the seller.

Figure 10:
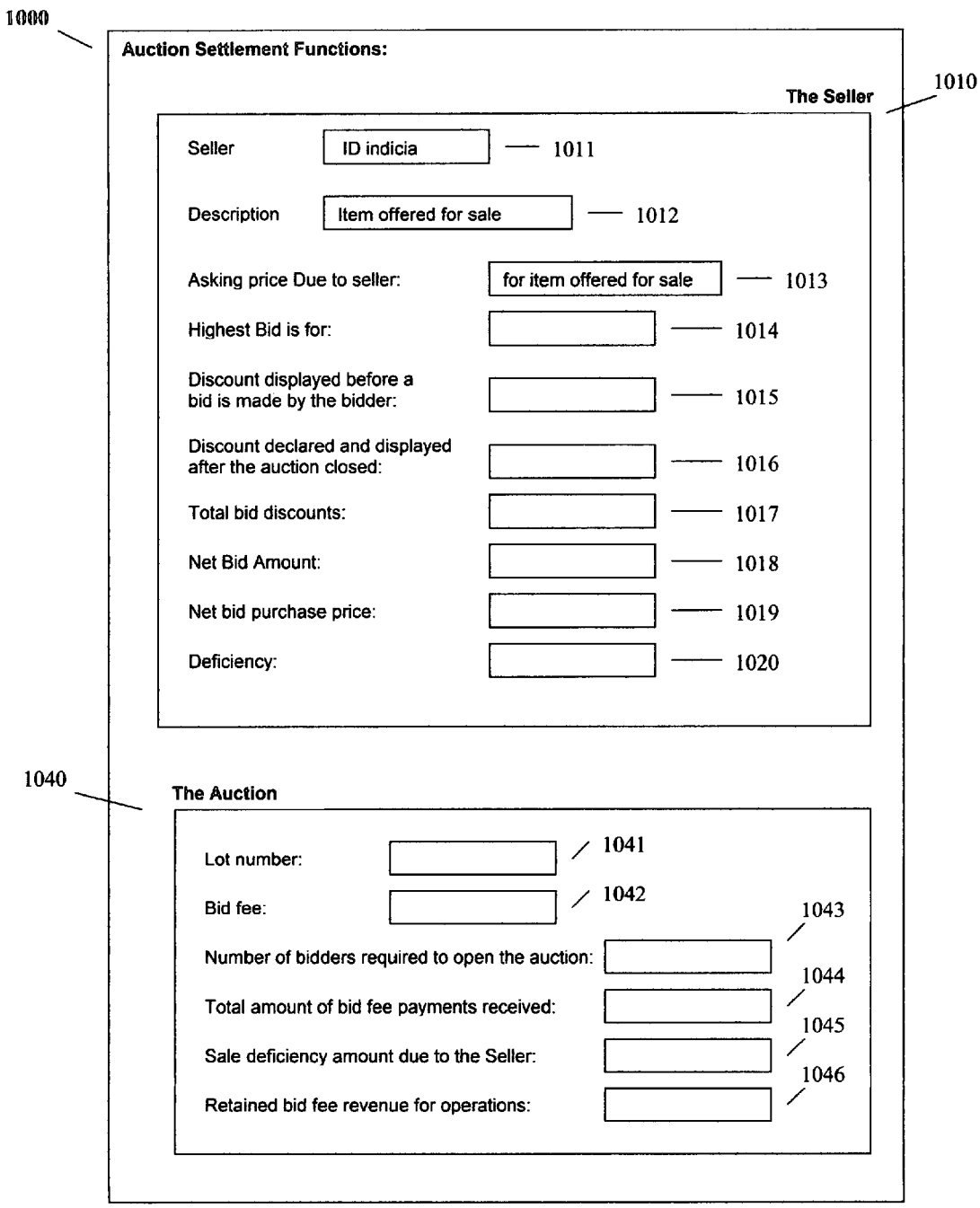
FIG. 10 at 1000 illustrates a auction settlement function between a seller and a auction. An example of a transaction could be at 1001.

FIG. 10, at 1020 further illustrates the auction would pay $700 from bid fees of $1,000 it received before the auction opened. Conclusion, the auction method allowed the seller to get his $1,000 asking price not from one $1,000 winning bid, but from one $300 winning bid and the difference for a portion of twenty $50 bid fee payments, creating a unique auction with no loss to the seller, a great bargain for the winning bidder and revenue to the auction.

SUMMARY OF THE INVENTION

This invention relates generally to the field of providing an alternative method for a marketplace venue for sellers and buyers to allow certain entities and persons the means, method and opportunity to offer, sell, bid on or buy certain products, items and services at anytime, from anywhere, in a auction-style method commonly referred to as online auctions, live auctions, auctions, absolute auctions, etc,. A number of auctions and auction methods exist in the prior art. Various methods are used in auctions today that have not provided revolutionary advanced means to enter a bidding process with a predetermined number of bids on a item that provides a discount that is displayed before a bid is made by the bidder, and a discount that is advertised from a minimum up to a maximum discount off the bid amount that is declared and displayed after the auction is closed. The discounts apply to the bidders initial bid and each raised bid and are not contingent on or to another condition. More specifically, this invention relates to certain revolutionary means and methods of improvements and technology in a type of auction system bidding process.

A number of auctions and auction apparatuses exist today and in particular live and internet auctions conducted by governments, private sector and charities with various motives, styles and formats to pursue their selling methods and goals, most all of which offer something of value to the highest bidder, who in turn pays the full amount of the winning bid to the seller for the item of value offered by a bidding process. In this method of auction, the Seller is generally seeking one qualified highest bid and the highest bidder is generally paying the full price for winning the bid. Various methods and apparatuses are used with auction, as a means to sell something of value to those that participate in auctions as a means to purchase something of value for various functions and purposes, have existed in the prior art.

A number of various auction 'clearing house marketplace' venues exist today and in particular clearing house marketplace for live and internet auctions conducted by governments, private sector and charities with various motives, styles and formats to pursue their marketing and selling methods and goals, most all of which offer something of value to the highest bidder, who in turn, pays the full amount of the bid amount to the seller for the item of value offered by a bidding process. In this method of auction, a clearinghouse generally provides a venue for the auction for a fee or other consideration. However, the seller listing the item for sale via the clearinghouse marketplace venue is generally seeking one qualified highest bid and the highest bidder is generally paying the full price for winning the bid. Various means and methods are used by auctions conducted through a auction clearing house marketplace, as a means to sell something of value to those that participate in auctions as a means to purchase something of value for various functions and purposes, have existed in the prior art.

Selling by auctions have been around for hundreds of years. Although such technology for auctions and auction clearing house markets have been widely known, accepted and applied, in order for the seller to receive sellers anticipated value for the item to be sold by auction method, such methods and technology have a limited scope of bidders that must pay the full bid price of normally 100% of the highest bid to purchase the item sold through conventional auction methods. Most of these auctions and clearing house marketplace applications are dependent on and restricted to, the present known art to conduct business and sales by auctions.

The present invention relates to a method where a seller can spread the value of the item for sale by auction among say;
(i) 100 bidders who each paid a bid fee of say, 1% of the value of the item identified by a lot indicia, and registered a opening bid and
(ii) wherein the time allotted by the auction for registration of bidder that paid a bid fee for a item identified by a lot indicia has ended, or the number of registered bidders required by the auction or seller to open the bidding has been reached and
(iii) wherein the bidding process is to begin at a designated time and end at a designated time and
(iv) when the bidding is opened, all registered opening bids are submitted to the auction and accepted as the bidders opening bid and
(v) wherein the auction or seller offers a discount that is displayed before a bid is made by a bidder wherein such discount is not contingent on or to another condition, and
(vi) wherein said opening bid discount can be for up to 50% off the bidders bid amount (% can vary), and
(vii) wherein the auction or seller offers discount that is displayed before a bid is made by the bidder, and a discount that is advertised from a minimum up to a maximum discount off the bid amount that is declared and displayed after the auction is closed. The discounts apply to the bidders initial bid and each raised bid and are not contingent on or to another condition, and
(viii) wherein, the discount that is displayed after the auction is closed can be for up to 40% off the bidders bid amount (% can vary), and
(ix) beginning when the bidding is opened and until the bidding is closed, each bidder can raise their bid at least once, and
(x) wherein, competitive bidding for a item identified by a lot indicia drives the bid offering price up, and
(xi) wherein after said bidding has closed, the auction or the seller declares a discount off the bid amount, which drives the bid purchase price down or lowers the net bid purchase price, Such art does not exist in the prior art It is an object of the invention to provide a method to offer and sell by means of a auction, for a seller to offer and sell an item for a stated price or value by a bidding process wherein a seller may;
(i) specify a registered bid to enter the bidding process.
(ii) specify a registered bid fee payment.
(iii) specify the registered payment amount submitted with a "registered bid."
(iv) determine the time or the number of registered bid fee or bids to open the auction.

(v) spread the sale price or value price among several bidders, verse to just one traditional winning bidder.
(vi) accumulate most all of the sale price or value price from bidder fees.
(vii) accumulate the sale price or value price from bidder fees and at least one winning bid payment.
(viii) offer at least one discount off the bidders bid amount wherein such discount is not contingent on'or to another condition and the discount displayed to the bidder before a bid is made by the bidder.
(ix) offer at least one discount off the bidders bid amount wherein such discount is not contingent on or to another condition and the discount is displayed to the bidder after the auction has closed,
Such means does not exist in the prior art.

The auction system allows the cost of a discount to be borne by either the seller or the provider of the auction system or by some combination of the seller or provider. For example, a seller registers with a provider to offer to sale an item on the provider's auction web site. The seller and provider may agree upon a discount that is displayed before a bidder makes a bid and the discount applies to each raised bid there from and wherein such discount is not contingent on or to another condition. The seller and/or provider may agree upon a discount off the bid amount for a discount that is displayed after the auction is closed. As a further example, assume sellers asking price from the auction (not the winning bidder) was $1,000 for a item offered for sale on the auction web site. The provider would structure the auction to open after the auction received bid fee payments of $1,000. Now assume the highest bidder was for $1,200 and all applicable discounts equaled 70% off the bid amount. That would reduce the bidders bid amount from $1,200 to $360. The bidder would purchase the item for $360 or 70% below the seller's asking price from the auction. An example of how seller is made whole, the provider would make up the difference between the $360 winning bid payment and $1,200 winning bid or $640 to the seller from $1,000 in bid fee payments received by the auction. The seller received his $1,000 asking price from a auction and the auction generated $360 for listing, hosting and advertising the auction. Such means does not exist in the prior art.

The present invention relates to a means for a person to register as a bidder, pay a bid fee, register a pre-opening bid to be entered when the bidding is open for a item identified by a lot indicia with a discount off the bid amount, wherein such discount is displayed before a bid is made by a bidder wherein the discount applies to each raised bid there from and wherein such discount is not contingent on or to another condition, which means does not exist in the prior art.

The present invention relates to a means for a person to register as a bidder, pay a bid fee, register a pre-opening bid to be entered to the auction when the auction is opened for a item identified by a lot indicia with a discount off the bid amount, wherein such discount is displayed before a bid is made by the bidder, and a discount that is advertised from a minimum up to a maximum discount off the bid amount that is declared and displayed after the auction is closed. The discounts apply to the bidders initial bid and each raised bid and are not contingent on or to another condition, which means does not exist in the prior art.

The present invention relates to a method wherein, at least one discount off the bid amount is made known by the seller to the bidder after the bidding has closed and wherein, the bidder would know the submitted bid amount, but would not know the discount amount until the auction has closed which would adjust the bidders final net bid amount, after which time, the winning bidder could purchase a item identified by a lot indicia for say, 15% of the value of the item bid on (the % can vary), which means does not exist in the prior art.

The invention relates to a framework to enable bidders to enter a bidding process to compete simultaneously for the highest winning bidder in real-time via the Internet, wherein, competitive bidding for a item identified by a lot indicia could drive the bid offering price up and after the auction is closed, a discount off the bid amount is displayed, which would drive the bid purchase price down and lowers the net bid purchase price, such means does not exist in the prior art.

The present invention relates to a method to provide for a bidder, to calculate at least one bid amount with a discount that is displayed before a bid is made by the bidder wherein discount applies to each raised bid there from and such discount is not contingent on or to another condition and deduct all applicable discount amounts off the bid amount and display the net bid amount to the bidder before the bidding submits bid or a raised bid, such means does not exist in the prior art.

The present invention relates to a method to provide for a bidder, to calculate at least one bid amount with a projected discount to a table that may contain such other information that a bidder could use for bidding strategies for a bidders perspective bid, bid limitations, cost to equity strategy, prospective bid amount above the value amount strategy and winning bid forfeit fee strategy, before a bidder submits his bid to the auction, such means does not exist in the prior art.

The present invention relates to a method wherein, for each auction identified by a lot indicia, there is a variable winning bid forfeit fee that is generated by the bidder each time the bidder bids above the value amount of the corresponding lot identified by indicia. Although there are no limits on the amount a bidder can bid, when a bidder bids above the value amount of the lot indicia, the bidder creates his own winning bid forfeit fee penalty, such means does not exist in the prior art.

The present invention relates to a method for providing a bidder with access to a special formulated bid strategy table wherein, a bidder can evaluate various bid strategies to help the bidder determine different bid amounts with certain discounts off the bid amounts to evaluate the net bid amount after deducting known discount amounts off the bid amount and unknown potential discount amounts off the bid amount and the bidders winning bid forfeit fee. Such table would have a winning bid forfeit formula that calculates the winning bid forfeit fee in relation to the bidders bid amount above the value amount identified by the lot indicia corresponding to the bidders bid indicia, such means does not exist in the prior art.

The above and other objects are achieved by a bidding process method or system having at least one discount that is displayed before a bid is made by the bidder, and a discount that is advertised from a minimum up to a maximum discount off the bid amount and is declared and displayed after the auction is closed. The discounts apply to the bidders initial bid and each raised bid and are not contingent on or to another condition. The registration and bidding process can be the same within the auction bidding system for various designated items listed for sale. (For example, if a given auction bid system has two or more different auction bidding process with described discounts going simultaneously, a bidder can enter one bidding process for the opportunity to be a winning highest bidder, while bidding another of the two or more auctions for the opportunity to be the winning highest bidder. Wherefore, more than one auction with a described discount can simultaneously be utilized within the auction listing and bidding system described herein). Such means does not exist in the prior art.

Although auctions have traditionally been seen as an efficient means to arrive at a fair market price for the item being auctioned, auctions of a fixed duration may see bidding activity clustered toward the end of the duration. That is, it appears that bidders maybe reluctant to place the first bid for an item. The bidders may delay placing their bids on the assumption that the final price will be higher if a bid is placed early in the auction. The belief among some bidders may be that a long period of active bidding may result in a higher final price then a short period of active bidding. Sellers, of course, would like to encourage a long period of active bidding to maximize the final sale price. It would be desirable to have a bidding system that would encourage bidders to bid early and encourage bidding to proceed at higher prices which can now be achieved because bidders would know there is a discount that is displayed before a bid is made by the bidder and the discount applies to each raised bid there from and wherein such discount is not contingent on or to another condition which would equate to a bid amount for a reduced sum to purchase the item bid on, which would drive the bid price down and lower the net bid purchase price for the item, such means does not exist in the prior art.

It is another object of the invention for a auction to offer and sell an item by a bidding method wherein, competitive bidding for a item identified by a lot indicia can drive the bid price up and after the auction has closed, the auction or seller declares a discount off the bid amount, which would drive the bid purchase price down and lowers the net bid purchase price for the item, such means does not exist in the prior art.

DESCRIPTIONS OF THE PREFERRED EMBODIMENTS

The preferred embodiments of the invention is described above in the Background Of The Invention and in the Brief Summary Of The Drawings and herein Descriptions Of The Preferred Embodiments. Unless specifically noted, it is the intention of the inventor that the words and phrases in the specifications be given the ordinary and accustomed meanings to those of ordinary skill in the applicable art(s). The description of a preferred embodiments and best mode of the Invention known to applicant at the time of filing the application has been presented for the purposes of illustration and description. It is not intended to be exhaustive or to limit the invention to the precise form disclosed, and many modifications and variations are possible in the light of the herein teachings. The embodiments were chosen and described in order to best explain the principles of the invention and its practical application and to enable others skilled in the art to best utilize the invention in various embodiments and with various modifications, methods and modes as are suited to the particular use contemplated.

It is the preferred that the bidding system be on a computer and operated by a computer. A bidder can access the bidding process via the Internet.

Figure 1:
FIG. 1 illustrates a web page through which a seller lists an item to be auctioned.

FIG. 1 at 100 illustrates a web page through which a seller lists an item to be auctioned, wherein a seller 101 is identified. The description of a item offered for sale 102 is identified. A picture of the item offered for sale 103 can be made available. Additional picture of the item offered for sale 104 can be made available. The asking price for a item that is the amount due to the seller 105. The item offered for sale has a value 106 that is displayed on the site corresponding to a lot number 107. A lot number 107 that corresponds to a seller 101 that corresponds to an item value 106 offered for sale on auction the web site identifies the auction. A discount 108 is displayed before a bid is made by a bidder wherein the discount applies to each raised bid there from and wherein such discount is not contingent on or to another condition that corresponds to seller 101 identified by a lot number 107 wherein, auction discount 108 is displayed by the Auction. A auction that identifies a number of bid fees 109 to be paid to the auction before the auction opens to accept bids. The auction web page further illustrates the duration 110 of the bidding time (hours, minutes, seconds) for the auction, select a category 112 to identify the item and a email category 113 for a email that may be sent to seller 101 wherein certain terms of the sale may be stated on the email. Example, an email for a vehicle category may contain different terms of purchase than a email for a real estate category or a electronics category.

FIG. 2 at 200 illustrates a web page through which a bidder 202 may pay a bid fee 207 by a payment method 210 and register a pre-opening bid 208 to be submitted to an auction identified by a lot number 201 when the auction is opened to accept bid 208, for bidder 202 to bid for a item 203 identified by a lot number 201 with a discount 206 that is displayed before a bid is made by the bidder wherein the discount applies to each raised bid there from and wherein such discount is not contingent on or to another condition. FIG. 2 at 220 further illustrates a auction open discount calculator wherein at bidders option, bidder 202 bidding on lot number 201 can enter on a web page, a projected bid amount 222 and press a button 223 wherein calculator 220 will display the auction discount 224 off a projected bid amount 222, the amount of the discount 225 and the amount of the projected bid 222 would be reduced and displayed at 226. FIG. 2 at 230 further illustrates a auction discount calculator wherein at bidders option, bidder 202 bidding on lot number 201 can enter a projected bid amount 231 and enter a projected discount amount 233 (that may be displayed after the auction has closed) whereby bidder 202 could press button 232 and calculator 230 would display the projected discount 233 off the projected bid amount 231 and display what the projected bid amount 231 would be reduced to, at 235.

FIG. 3 at 300 illustrates a email page through which an auction identified by a lot number 303 provides to a bidder at the bidders email address 302 registered with an auction identified by a lot number 303 corresponding to a bid number 304 wherein, email 302 would serve as confirmation of bidder 304, bid fee payment 301, pre-opening bid 306 discount off the pre-opening bid 305 for bid number 304.

FIG. 4 at 400 illustrates a email page notice to open and close the auction through which a auction identified by a lot number 402 provides to bidder identified by bid number 404 at the bidders email address 401 registered with an auction identified by a lot number 402 corresponding to a bid number 404 wherein email 400 would provide notice to a bidder identified by a bid number 404 of; (a) the date and time for the auction to open to accept bids with a discount that were displayed before the bid was made by the bidder, wherein the discount applies to each raised bid there from and wherein such discount is not contingent on or to another condition, for lot number 406 will be on the date stated at 407, beginning at a stated time 408, and (b) the date and time for the auction to close for lot number 409 for bids with a discount displayed before a bid is made by the bidder, and a discount that; (i) is advertised from a minimum up to a maximum discount off the bid amount and (ii) is declared and displayed after the auction is closed, which will end on a stated date 410 and time 411. The discounts apply to the bidders initial bid and each raised bid and are not contingent on or to another condition.

FIG. 5 at 500 illustrates a web page through which; a pre-registered opening bid 507 corresponding to a auction lot number 502, to a bid number 506 for a item 503 that may include a description 504 of a item with a value 505 advertised, wherein a bid 507 can be electronically submitted 501 to a auction and accepted by the auction 501 as a opening bid 507 identified by a bid number 506 for lot number 502.

FIG. 5. at 510 further provides that, when a auction is opened to show a auction discount 512, that is displayed before a bid is made by a bidder wherein the discount applies to each raised bid there from and wherein such discount is not contingent on or to another condition. There are no limits on the amount of an opening bid 507 or a raised bid 514. A bidder may raise the bid amount 514 as often as the bidder likes until the bidding ends 518. A bidder can use bid calculator 515 to calculate a bid and view bid strategy before a bidder submits his raised bid 514. The bid calculator 510 allows a bidder the opportunity for strategies in determining bid opportunity, bid limits, risks, etc. The bidding process 510 can provide a winning bid position 516 which, if a bidder does not have the current highest bid, can allow a bidder to know how many bidders are between his current bid and the current highest bidder, which can be in real time or updated each time a bidder checks 515 to calculates a new bid amount 514 and clicks submits 517 to enter the new bid 514.

FIG. 5 at 520 further allows for a calculator on the page or a link thereto wherein, bidder identified by a bid indicia 506 can raise the opening bid 507 and elect 513 to enter a new projected bid amount 521 before bidder 506 submits a new bid or a raised bid 521, wherein bidder can enter a projected bid amount 521 and project a discount 523 and click show examples 524. The calculator would produce the auction discount displayed before a bid is made 522, and projected auction discount displayed after the auction closed 523, and display discount off the bid 525, and from the projected bid amount 521, the bid would be reduced to 526 and a winning bid forfeit fee 527. A calculator for a bidder to project a discount off a projected bid amount that is declared and displayed after the auction is closed, could be a very useful strategy for a bidder.

FIG. 6 at 600 illustrates a web page through which table 601 is comprised of a bid number 602, a lot number 603 corresponding to a value of a item offered for sale 604. The current highest bid is displayed 605 along with the auction discount displayed before a bid is made 606. Wherein a bidder has the option to make a new bid 607, with an additional option to click 609 and have the bid calculated and displayed on a table 620 comprised of certain results, before the new bid 608 is submitted 611 to the auction identified by lot number 603. The bidder can see his win the bid position 610 and has the option 607 to either raise his bid 608 again or click button 611 and submit the new bid. The system provides a time function controlling when the auction will end 612 for a bid with a discount that is displayed before a bid is made by the bidder, and a discount that is advertised from a minimum up to a maximum discount off the bid amount and is declared and displayed after the auction is closed. The discounts apply to the bidders initial bid and each raised bid and are not contingent on or to another condition.

FIG. 6 at 620 further illustrates a example for a table of a auction illustrating a value 621 for $100, and the last bid registered 622 for $1,000 as a result of a bid 608 and submitting that bid 611. An example for a bid over or under the value amount 623 is 900% which reflect whether a bid placed 608 is over or under the value amount 604 and the total discount examples are shown at 625, the total discounts off the bid amount is shown at 626 and the bid amount after deducting all discounts is shown at 627. The table further illustrates the bid purchase price gain or loss shown at 628, the bid amount verses the purchase price at 629 and the net bid ratio to the bid forfeit fee at 630. The table further shows a formula at 631 used for calculating a bid forfeit fee 632. Example, $200 per each thousand dollars above the value amount 604, would equal the bid forfeit fee 632 or if the bidder bids is under the value amount 604, then the bid forfeit fee is stated at 633.

FIG. 6 at 620 further illustrates an example of the table for; column 640, showing a total discount at 650 of 51% off a $1,000 bid at 622 for a item valued of $100 shown at 621 or a bid amount of 900% at 623 over the value amount at 621 or $900 above the value amount at 624, wherein the total discount at 625 is shown for 51% off the bid amount at 622. The total discount at 626 would be $510 off the bid amount at 622, leaving the net bid for $490 at 627. The bid purchase price gain or loss is shown at 628, the bid amount verses the purchase is shown at 629 and the net bid ratio to the bid forfeit fee is shown at 630. A winning bid forfeit fee formula is shown at 632 wherein such formula is predicated on the formula entry at 631, which for this example would be; $200 (631) per thousand dollars above the value at 621, for the bid amount shown at 622 which the bid at 622 is 9 times over the value of 621. Another example would be $200 (631)×900% (623) equals winning bid forfeit fee of $180 (632). A bid forfeit fee for a bidder that places a registers bid (622) below the value (621) is shown at 633. The winning bid forfeit fee is the amount shown at 632 or 633 whichever is higher.

FIG. 6 at 620 further illustrates an example of table for; column 644, showing a total discount at 654 of 90% off a $1,000 bid at 622 for a item valued of $100 shown at 621 or a bid amount of 900% at 623, over the value amount at 621 or $900 above the value amount at 624, wherein the total discount at 625 is shown for 90% off the bid amount at 622. The total discount at 626 is show for $900 off a $1,000 bid amount at 622, leaving the net bid for $100 at 627. The bid purchase price gain or loss is shown at 628, the bid amount verses the purchase is illustrated at 629 and the net bid ratio to the bid forfeit fee is illustrated at 630. A winning bid forfeit fee formula is shown at 632 wherein such formula is predicated on the formula entry at 631, which for this example would be; $200 (631) per thousand dollars above the value at 621, for the bid amount shown at 622 which the bid at 622 is 900% over the value of 621. Another example would be $200 (631)×9 (624) equals winning bid forfeit fee of $180 (632). A bid forfeit fee for a bidder that places a registers bid (622) below the value (621) is shown at 633. The winning bid forfeit fee is the amount shown at 632 or 633 whichever is higher.

FIG. 7 at 700 illustrates a web page through which a bidder identified by indicia 705 corresponding to auction lot number 701, the web page may include information regarding the auction such as; the auctions lot number 701, the name of the item sold 702, brief description of the item 703 along with the value 704 advertised on the auction web pages, and a bid number 705 for a bidder that paid a bid fee 706 to bid on lot number 701. The web page further illustrates bidding for lot number 701 was opened for bidding on a stated date and time 708 and bidding for lot number 701 ended on a stated date and time and the auction closed 709. The web page further illustrates the auction discount before a bid is made by the bidder 710, and the auction discount displayed after the auction closed 711, the total of all discounts 712 and the bid amount 713 after deduction all discounts for lot 701 off the final bid 707.

FIG. 7 at 730 further illustrates a results table wherein, the system may display to a bidder identified by a bid number 705, on a top row of table 730, so that such bidder 705 could see the results of an auction identified by a lot number 701. The top row of table 730 may contain; the bidders ID 714, bid number 715, bid amount 716, with a discount displayed before a bid is made by the bidder 717 and a discount displayed after the auction closed 719 off the bid amount 718 wherein the discount applies to each new bid 718 from initial bid 716 and wherein such discounts are not contingent on or to another condition. The discount percentage off the bid amount 707 is shown at 717 and the discount percentage off the raised bid amount 718 is shown at 719. The total discount of 717 and 719 is shown at 720. The total dollar amount for discount 717 and 719 are shown at 721. The net bid after deducting discount 721 is shown at 722.

FIG. 7 at 730 further illustrates table wherein, row 740 can be designated for a winning bidder so that bidder 705 could readily see the results of an auction identified by a lot number 701 identifying the winning bidder. Row 740 of table 730 may contain; the bidders ID 731, bid number 732, a opening bid displayed before a bid is made 733 and a discount off the bid amount 734, a raise bid amount 735 with a discount displayed after the auction closed off the bid amount 736. Total discount percentage off the bid amount 737. The total of all discount amounts 738, the net bid amount 739 after deducting all discount 738 from the last bid amount 707 which equals raised bid amount 735 and indicia announcing the winning bidder on row 740.

FIG. 7, table 730 further illustrates row 741 which can be designated to identify the second highest bidder after the winning bidder identified on row 740, a third highest bidder can be identified on row 742, and a fourth highest can be identified on row 743 and so on from highest to the lowest highest bidder of a auction or the bidders can be identified in any order.

Figure 8:
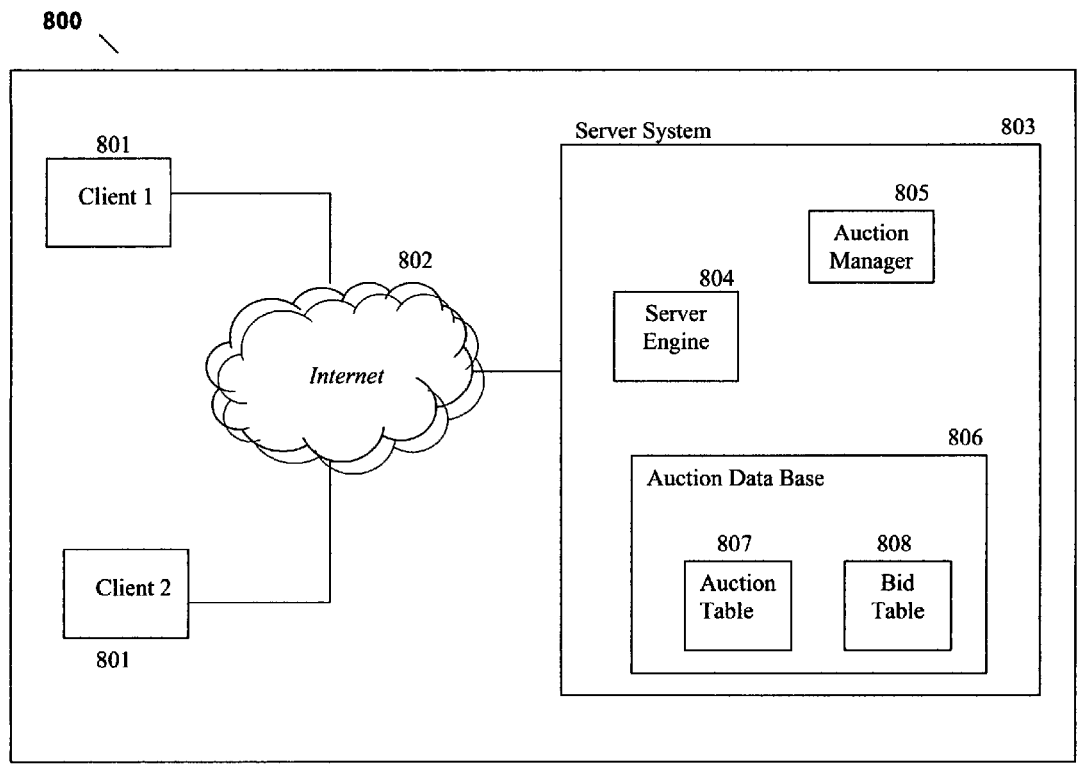
FIG. 8 is a block diagram 800 illustrating the components of the auction system in one embodiment.

FIG. 8 at 800 is a block diagram illustrating the components of the auction system in one embodiment. The client computers 801 and the server computer 803 are interconnected via the Internet 802. The computers may include a central processing unit, memory, input devices (e.g., keyboard and pointing device), output devices (e.g., display devices), and storage devices (e.g., disk drives). The memory and storage devices are computer-readable media that may contain computer instructions that implement the auction system. The client computers may use a browser to access the web pages via the Internet. The server computer implements the auction system. The auction system includes a server engine 804, an auction manager 805, and an auction database 806. The server engine receives requests for resources (e.g., web pages) via the Internet and coordinates the generation and transmission of the resources.

The auction manager coordinates the conducting of the auctions. The auction manager stores auction listings and bidding histories in the auction database. When an auction closes, the auction manager 805 select all auction discounts applicable off the last bid amount for at least a winning bidder for that auction lot number. The auction manager compiles the discount displayed before a bid that was made by the bidder FIG. 7 at 710, that was applicable from when the auction opened and until the auction closed. FIG. 7 the auction manager further compiles the date and time the auction opened 708 with a bid FIG. 2 at 208 with a discount 206 displayed before a bid was made by a bidder 202, the date and time the auction closed FIG. 7 at 709, the discount that is declared and displayed after the auction closed Fig at 711, all discounts off the bid amount that the auction manager determines applicable after the auction closed and selects the winning bidder FIG. 9, at 917 and notifies the winning bidder FIG. 9 at 918 and the seller 919. The auction database 806 includes an auction table 807 and a bid table 808: The auction table includes entries for each auction.

Each entry contains a auction discount displayed before a bid is made FIG. 7, at 710 and a auction discount displayed after the auction closed FIG. 7, at 711 indicating whether the auction is subject to a auction discount displayed before a bid is made and/or a auction discount displayed after the auction closed. The bid table 808 includes an entry for each bid that has been placed for each auction. When the auction is closed, the auction manager accesses the bid table to identify the winning bidder and to determine whether to apply a auction discount off the bidders final bid amount for a discount displayed before a bid is made and/or a auction discount displayed after the auction closed.

Figure 9:
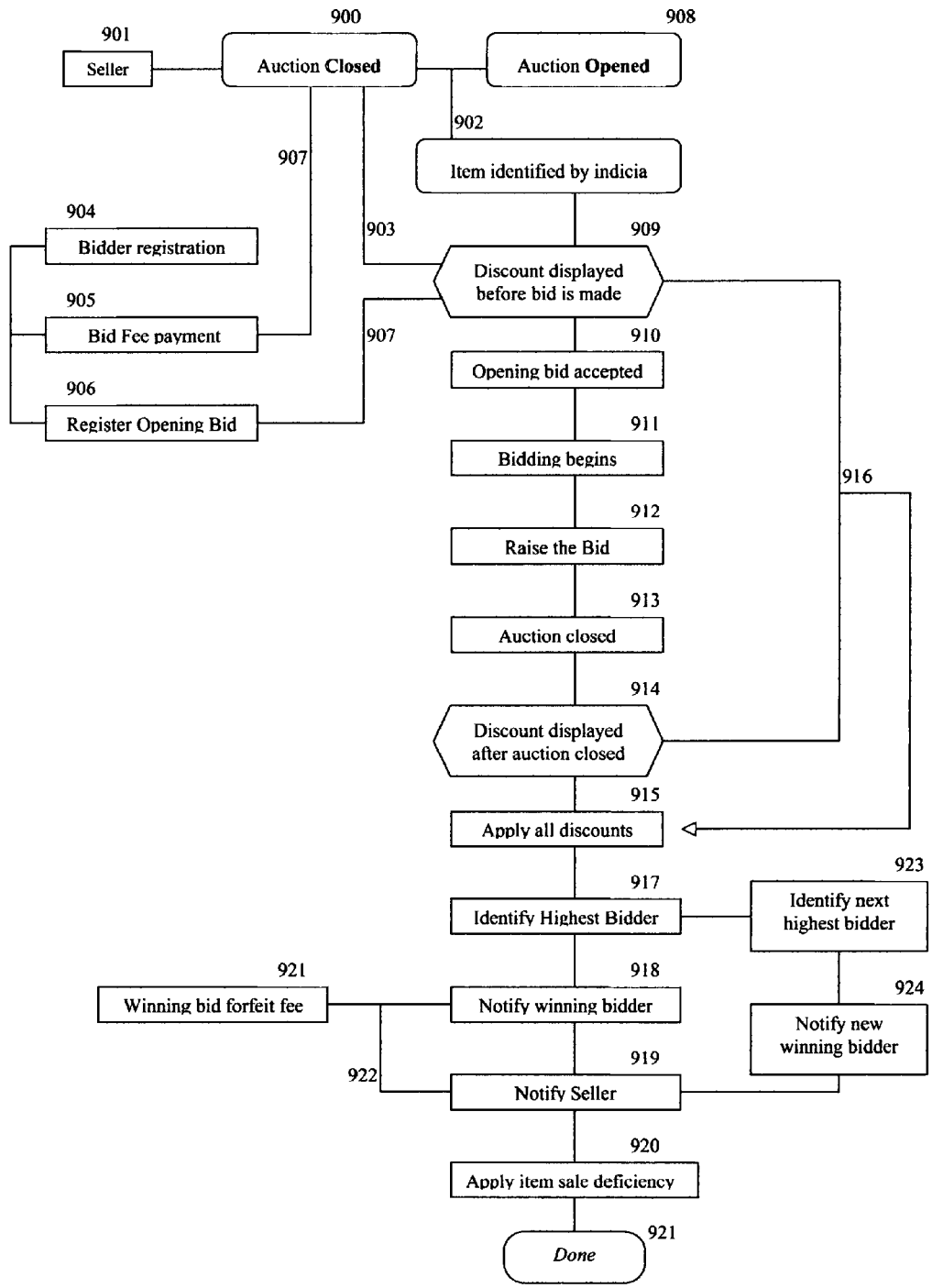
FIG. 9 is a flow diagram that illustrates example processing of a function of the auction manager process to open and a closed a auction.

FIG. 9 is a flow diagram that illustrates example processing of a function of the auction manager to open and process a closed auction. The function includes identification of the auction that has been opened and closed because, for example, its duration to open or close has expired. The function determines if the auction is subject to a seller, an item listed for sale, an auction discount displayed before a bid is made and/or a auction discount displayed after the auction is closed, and if so, the function applies such discount that is advertised while the auction was open and/or the function applies a discount that is determined after the auction is closed. After the auction is opened and prior to when the auction is closed, the function applies raised bids that are above the opening bid amount. The function notifies the seller and the winning bidder. The function applies the auction settlement deficiency to the seller.

Step 1 illustrates a closed auction 900 that has not opened for bidding 908 for a item identified by a lot number 902 wherein, a seller 901 can register with a closed auction 900 to offer for sale an item identified by indicia 902 with a auction discount 909 beginning 903 when the auction is opened 908.

Step 2 illustrates a person registers as a bidder 904 and pays a bid fee 905 to 907 a closed auction 900. Next, registered bidder 904 registers an pre-opening bid 906 that has a advertised discount 907 for a discount 909 with a auction 903 that is a closed auction 900.

Step 3 illustrates a open auction 908 offering an item 902 for sale by a bidding process with the highest bid, winning the right to purchase the item for the amount of the highest bid less all applicable discounts off the bid amount Step 4, the function illustrates a open auction step 908 offering an item step 902 for sale by a bidding process with an auction discount step 909 wherein, all registered bidders step 904 along with each of their registered pre-opening bids step 906 are accepted step 910 to the auction step 908 after which time, the auction notifies all registered bidders step 904 for lot number step 902 that the auction is open for bidding step 911 for auction for lot number step 902 offered with a auction discount step 909 that is displayed before a bid is made by a bidder, wherein the discount applies to each raised bid wherein such discount is not contingent on or to another condition, and a discount step 914 that is displayed after the auction is closed wherein discount is not contingent on or to another condition. After the bidding begins step 911, bidders can raise their bids step 912 for any amount and as often as a bidder may want to raise a bid (to try to be the winning bidder which promotes competitive bidding) until the bidding ends, at which time, the auction for that lot number step 902 is closed at step 913.

In step 915, the function identifies applying discount step 916 to the last raised bid step 912 to a bidder identified at step 904.

In step 917, identifies the bidder who placed the highest bid to be revealed at FIG. 7 bid results table at row 740.

In step 915, identifies applicable discount step 909 and step 914 and applies the discount to the winning bid to generate a discounted final price.

In step 918, the function notifies the winning bidder step 921 of the final price.

In step 918, the function notifies the seller step 919 of the final price and applies item sale deficiency step 920 to seller step 901, then completes the auction as done.

In step 918, if a winning bidder step 921 fails to purchase the item step 902 pursuant to the auction step 908 terms of the sale, then the step 918 function may be to notify the next highest winning bidder step 923 and notify bidder step 923 as the new winning bidder step 924 and notify the seller step 919 of the final price and then completes the auction as done. If winning bidder step 924 fails to purchase the item step 902 pursuant to the auction step 908 terms of the sale, then the function step may be to repeat the process to identify the next highest bidder step 923, notify such bidder as the new highest bidder and notify the seller step 901 this process may continue until a purchase is final.

FIG. 10 at 1000 illustrates a function for a settlement transaction; to distribute certain funds received from registered bid fees 1042 to a seller 1010 identified by sellers ID number 1011 for payment of an item 1012 offered for sale identified by a lot number 1041. Wherein, the auction settlement functions 1010 allows a seller 1011 identified by a lot number 1041 to offer for sale an item 1012 for a sale amount that will be due to the seller 1013 from the highest bidder 1014 after deducting the advertised auction discount 1015 and auction discount 1016 representing by the total discounts 1017 to arrive at a net bid amount 1018 which represents the bidders net bid purchase price 1019 to purchase the item 1012 identified by a lot number 1041 from seller 1011.

FIG. 10 at 1040 further illustrates an auction identified by a lot number 1041 for bid fee payments 1042 to be paid by a bidder registering to bid for an item 1012 identified by a lot number 1041 wherein a certain number of bidders are required to open the bidding 1043 and if such number of bidders register and pay the bid fee 1042, the total amount of bid fees received would be 1044. However, because the item 1012 sold to the highest bidder for the net bid purchase price 1019, which is for an amount less than what is due to the seller 1013, auction 1040 makes up the deficiency 1020 and 1045 from the highest bidder buying the item for a lesser amount 1019 than the sellers asking price 1013 from the auction 1040 due seller and the difference from bid fees 1044 received by the auction 1040, resulting in the seller receiving the full asking price 1013, after which time, the auction 1040 retains remaining bid fee revenue for operations 1046 of the auction.

It one skilled in the art will appreciate that the concepts of the auction system can be using various environments other then the Internet. For example, the concepts can also be used in an electronic mail environment in which electronic mail messages may be used to provide information on auctions and to place bids at the auctions. Also, various communication channels may be used such as a local area network, wide area network, or a point-to-point dial-up connection instead of the Internet. The server system may comprise any combination of hardware or software that can support these concepts. In particular, a web server may actually include multiple computers. A client system may comprise any combination of hardware software that interacts with the server system. The client systems may include television-based systems and various other consumer products through which auctions may be conducted. Moreover, the concepts of the present invention may be applied to auctions that are not supported by computer systems or that are only partially supported by computer systems.

From the foregoing it will be appreciated that although specific embodiments of the auction system have been described for purposes of illustration, various modifications may be made without deviating from the spirit and the scope of the invention. Accordingly, the invention is not limited except by the following.

DETAILED DESCRIPTION OF INVENTION

The present invention is summarized below only for purposes of introducing embodiments of the invention. The ultimate scope of the present invention is to be limited only to any claims that may ultimately be allowed.

It is an object of the invention to provide an alternative method for a bidding process with a discount for a item offered for sale by bidding method.

It is an object of the invention to provide a bidding process with more than one discount for a item offered for sale by bidding method.

It is an object of the invention to provide a discount that is displayed before a bid is made by a bidder wherein the discount applies to each raised bid and the discount is not contingent on or to another condition.

It is still another object of the invention to provide a discount displayed before the bidder makes a bid and a discount that is displayed after the auction is closed. The discounts apply to each raised bid and are not contingent on or to another condition.

It is another object of the invention to provide a framework to enable bidders to enter a bidding system to compete simultaneously to try to be the highest bidder in real-time via the Internet or other means.

It is another object of the invention that an item listed for sale by a bidding process be assigned a listing identification indicia.

It is another object of the invention that an item for sale be assigned a registration identification indicia.

Still it is another object of the invention that a method for an item for sale state the value of the item offered for sale by the auction system.

It is another object of the invention that a method for an item for sale may state listing fees, cost & taxes associated with the sale by the auction system.

It is another object of the invention that a method for an item offered for sale, with a discount that is displayed before a bid is made by a bidder wherein such discount is not contingent on or to another condition, to state the time or method to open the auction.

It is another object of the invention for a method to determine and specify a time or number of registered bids required to open the auction for an item offered for bid on the system.

It is another object of the invention that a method with means for the registration a bidder along with a bid payment amount to be eligible to bid on an item offered for bid within the system.

It is another object of the invention that a method with means for registration a bid payment amount submitted with an opening bid with a discount, that is displayed before a bid is made by the bidder wherein such discount is not contingent on or to another condition, to be eligible to bid on an item offered for bid within the auction computer system.

It is still another object of the invention to provide a method to record and track a pre-opening bid with no minimum or maximum bid amount.

It is still another object of the invention to provide a method to record and track a bid that is raised with no minimum or maximum bid amount.

Another object of the present invention is to provide a method to register a pre-opening bid containing indicia that identifies registration of the bid with a discount that is displayed before a bid is made by the bidder wherein such discount is not contingent on or to another condition, wherein the bid amount for an item offered for sale is identified by a lot number.

It is another object of the present invention to provide a method to open an auction and accept previously registered opening bids.

It is another object of the present invention to provide a time to open an auction with a discount that is displayed before a bid is made by a bidder wherein the discount applies to each raised bid there from and wherein such discount is not contingent on or to another condition and close a auction.

It is another object of the present invention to provide a time to open the bidding and close the bidding for an auction with a discount that is displayed before a bid is made by a bidder wherein the discount applies to each raised bid there from and wherein such discount is not contingent on or to another condition.

It is still another object of the present invention to determine a discount from a initial bid wherein discount is displayed after the auction is closed. The discount applies to each raised bid and is not contingent on or to another condition.

It is an object of the present invention to combine a auction with a discount that is displayed before a bid is made by a bidder and a discount that is displayed after the auction is closed. The discounts apply to each raised bid there from and are not contingent on or to another condition.

It is another object of the present invention to sell an item to the highest bid after deducting all applicable discounts.

It is still another object of the present invention to provide a method to open an auction and accept previously registered opening bids that corresponds to a lot number identified by indicia.

It is still another object of the present invention to provide a method to open an auction and accept a previously registered opening bid that corresponds to a lot number identified by indicia, that corresponds to a bidder identified by indicia that registered as the bidder identified to the opening bid.

The preferred embodiments of the inventions are described in the Figures and Detailed Description. Unless specifically noted, it is intended that the words and phrases in the specification be given the ordinary and accustomed meaning to those of ordinary skill in the applicable art or arts. If any other meaning is intended, the specification will specifically state that a special meaning is being applied to a word or phrase.

What is claimed is:

1. A non-transitory computer readable medium for storing computer implemented instructions, said instructions for causing a computer system to perform a method for conducting an auction, said method comprising:
    a. providing a description of an auction item at an auction comprising a plurality of auction bidders through a computer interface,
    b. receiving at least one high bid for said auction item at said computer system from one said auction bidder through said computer interface,
    c. providing a discount off said high bid, wherein said discount is displayed to all auction bidders prior to a bid made by any said auction bidder,
    d. wherein said discount is:
        i) calculated on a percentage or a fixed sum,
        ii) declared and displayed before said auction opens,
        iii) declared and displayed after said auction closes,
        iv) displayed to said auction bidders before any bid is made by any said auction bidder,
        v) applied to every said high bid during said auction bidding process,
        vi) is not contingent on another condition,
        vii) under the control of said computer system during said auction bidding process, and
        viii) under the control of said computer system before and after said auction bidding process, and
    e. wherein said computer system sets a final price for the item at a discount from a winning auction bid for a winning said auction bidder.

2. The non-transitory computer readable medium claim 1 wherein a seller of said auction item designates said discount.

3. The non-transitory computer readable medium of claim 1 wherein a seller of said auction item designates said discount from a low amount to a high amount.

4. The non-transitory computer readable medium of claim 1 wherein a seller of said auction item designates an asking price for said auction item.

5. The non-transitory computer readable medium of claim 1 wherein a seller designates an asking price for said auction item, wherein said asking price is paid to said seller from an auction winning bid payment and by auction fees received from said auction bidders for said auction item.

6. The non-transitory computer readable medium of claim 1 wherein said discount is borne by a seller of said auction item or a provider of said auction.

7. The non-transitory computer readable medium of claim 1 wherein said auction item is for a quantity of at least one.

8. The auction method of claim 1 wherein a person:
a) registers as said auction bidder,
b) pays a fee to bid in said auction, and
c) wherein said discount is displayed before said fee is paid.

9. The non-transitory computer readable medium of claim 8 wherein said discount is displayed after said auction is closed.

10. The non-transitory computer readable medium of claim 1 wherein a person registers as said auction bidder, pays a fee to bid in said auction, wherein said fee is applied to a requirement for opening bidding of said auction.

11. The non-transitory computer readable medium of claim 1 wherein the computer provides winning bid position indicia, wherein if said bidder has not submitted the current highest bid, said computer system displays to said auction bidder the current said high bid and name of said high bidder.

12. The non-transitory computer readable medium of claim 1 wherein a bid forfeit fee is displayed to a bidder according to a predetermined criterion.

13. The non-transitory computer readable medium of claim 1 wherein a low bidder below the current highest bid receives a display of the number of bidders between said low bidder and the current highest bid, wherein said display of the number of bidders is updated continuously or each time any bidder submits a new bid.

* * * * *